United States Patent [19]

Jörgens

[11] Patent Number: 5,535,052
[45] Date of Patent: Jul. 9, 1996

[54] LASER MICROSCOPE

[75] Inventor: Reinhard Jörgens, Aalen, Germany

[73] Assignee: Carl-Zeiss-Stiftung, Heidenheim, Germany

[21] Appl. No.: 91,901

[22] Filed: Jul. 14, 1993

[30] Foreign Application Priority Data

Jul. 24, 1992 [DE] Germany ............... 42 24 376.9

[51] Int. Cl.$^6$ .................. G02B 21/06; G02B 21/00
[52] U.S. Cl. .................. 359/388; 359/368; 359/381; 359/385
[58] Field of Search .................. 359/388, 389, 359/390, 385, 368, 386–390, 372–373

[56] References Cited

U.S. PATENT DOCUMENTS

| | | | |
|---|---|---|---|
| 2,910,313 | 11/1959 | Michel | 359/388 |
| 3,551,019 | 12/1970 | Michel | 359/388 |
| 3,798,435 | 3/1974 | Schindl | 359/388 |
| 3,851,949 | 12/1974 | Kraft et al. | 359/388 |
| 4,549,787 | 10/1985 | Tauner | 359/889 |
| 4,756,611 | 7/1988 | Yonekubo et al. | 359/389 |
| 4,843,242 | 6/1989 | Doyle | 359/389 |
| 4,965,441 | 10/1990 | Picard | 359/389 |
| 5,011,243 | 4/1991 | Doyle et al. | 359/389 |

FOREIGN PATENT DOCUMENTS 134609 6/1991 Japan ............... 358/385

OTHER PUBLICATIONS

Volker Wilke et al, "GIT Fachz . . . ", Zeiss, West Germany, 1984, brochure, 6 pages.

*Primary Examiner*—Thong Nguyen

[57] ABSTRACT

In a microscope with a laser illumination, the laser beam is coupled in over the reflected light illumination beam path from the rear side of the microscope stand. The reflected light illumination reflectors are received in a slide with several switching positions. In one switching position, the slide is fitted with a fully reflecting mirror. The position of the fully reflecting mirror is monitored by sensors. The sensors are coupled to a shutter, such that the laser beam is only released when the fully reflecting mirror is inserted. The microscope is constructed as a laser scanning microscope of the inverted type. Sensors are also provided on a pivotable arm that supports a housing. The housing holds a transmitted light condensor and folding mirror above the object stage, and protects against inadvertently looking into the laser light. The signals from both sensors are connected together in the sense of a logic AND circuit, The laser beam path is closed by the shutter (and the laser is released) only when both sensors signal a safe state.

19 Claims, 2 Drawing Sheets

LASER MICROSCOPE

FIELD OF THE INVENTION

The present invention relates to a microscope in which radiation harmful to the eyes, such as laser radiation, is used for illumination of the object.

BACKGROUND OF THE INVENTION

A microscope is known from U.S. Pat. No. 4,737,022 in which laser light is coupled into the reflected light beam path for conventional illumination. However, the laser light does not per se serve for illumination of the object. On the contrary, an autofocus signal is produced by means of the laser light. The lasers are therefore designed to have a very low power, so that their radiation does not act harmfully on the eyes.

Laser scanning units adaptable to conventional microscopes using a laser beam for object illumination are known from U.S. Pat. No. 5,032,720 and WO 92/02839. These microscopes differ from the present invention in that the coupling-in of the laser beam takes place from above, in the photo outlet of the microscope. Coupling-in the laser beam from above has two disadvantages. First, such a system results in a very high, potentially unstable structure. Secondly, in such a system, the photo outlet is no longer available for conventional applications.

The second disadvantage is avoided in the laser scanning microscope of the present inventor's assignee (described, for example, in the brochure No. 42-920 d with the printer's imprint AW-H-VII/88 Uoo). In this microscope, the laser is arranged vertically behind the microscope stand. The laser beam is coupled into the microscope via a beam path running above (parallel to) the conventional reflected light illumination beam path. The coupling-in takes place via a fully reflecting mirror, arranged in a slide. One slide position is unoccupied, and in this switching position the observation light reaches the photo outlet. In this system, the disadvantage lies in the construction of the whole laser scanning unit being adapted to a special stand, especially in regards to the height of the stand. Consequently, an adaptation of the laser illuminator to different stands is only possible by a structural modification.

A laser scanning microscope that couples the laser beam into the microscope via the conventional reflected light illumination beam path is known from the article "Laser Scanning Microscope—Construction and Applications" in GIT Fachz. Lab. 28, (1984). To prevent eye damage, the visual observation beam path is blocked during laser scanning operation. The article does not specify by what means the visual observation beam path is blocked. Nor does it specify whether or how a possible operating error (that results in the observation beam path being freed, in spite of the laser scanning operation) is prevented from arising.

A microscope with a laser micromanipulator is known from European Patent 0,101,572-B1. The manipulation beam is coupled into the microscope via the conventional reflected light illumination beam path. A shutter is arranged between the laser and the illuminating reflector. However, its mode of operation is not described in more detail. The illuminating reflector is constructed as a partially reflecting mirror. The laser light scattered or reflected at the object is always reflected into the ocular by the illuminating reflector. When looking into the ocular and focusing on strongly reflecting object structures, considerable danger of eye damage exists for the observer.

SUMMARY OF THE INVENTION

The object of the present invention is to provide a microscope having a laser illumination or another illuminating radiation that can damage the eyes, and in which no limitations arise with regard to conventional utilization. The laser illumination is to be adaptable as easily as possible to different microscope stands. In addition, eye damage to the observer looking into the ocular is to be made impossible. This is achieved by means of a microscope according to the present invention, that has the following features:

The microscope according to the present invention consists of a stand with an observation tube arranged on its front side. One or more beam splitters and a mirror (used to deflect a reflected light beam path towards an objective) are provided on a slide or revolving holder. The coupling-in of the laser beam or of another illuminating radiation that can cause eye damage takes place from the rear side, opposite the front side, into the reflected light beam path provided for conventional reflected light illumination.

Since the laser radiation is also coupled into the conventional reflected light illumination beam path, no limitations arise in terms of the microscope's possible applications. Moreover, coupling-in the laser illumination from the rear side of the stand has the effect that the accessibility of the microscope stage is in no way limited. The space laterally of the microscope stand is fully available for positioning micromanipulators, etc. Microscope stands usually provide an interface for coupling the reflected light illumination beam of the reflected light illumination beam path. Consequently, the present invention requires no constructional changes to the stand.

The slide or revolving holder of the reflected light reflector contains a fully reflecting mirror in one switching position. The fully reflecting mirror deflects the entire laser light to the objective, and the light reflected at the sample is reflected back into the reflected light beam path. The incursion of laser light into the observation tube is prevented. For laser microscopy using conventional illumination, e.g. by means of a halogen lamp, one of the beam splitters can be switched into the beam path instead of the fully reflecting mirror. This allows the object to be observable through the ocular.

Furthermore, a sensor is provided for the detection of the switching position in which the fully reflecting mirror is switched into the beam path. Coupling this sensor with a shutter arranged between the laser and the fully reflecting mirror ensures that laser radiation is only coupled into the microscope when the fully reflecting mirror is switched into the beam path. In another switching position of the slide, the beam splitter is switched into the beam path for observation through the ocular, and the laser illumination is switched off. The present invention ensures that the beam path to the eye is always interrupted when the laser beam is released.

In an advantageous embodiment, the microscope is a laser scanning microscope. In this case, a beam deflecting unit is provided between the laser and the beam splitter or mirror. The beam deflecting unit deflects the laser beam into two mutually perpendicular directions. Since the present invention requires that there be no encroachment on the microscope stand, the beam deflecting unit has to be arranged in a separate housing part arranged behind the microscope stand.

For confocal microscopic fluorescence investigations a respective stop can be arranged in each of several planes that are confocal with the focal plane of the objective. These several confocal planes are connected mutually in parallel via color dividers with different spectral transmission characteristics. In this manner, fluorescence investigations at correspondingly different wavelengths are simultaneously possible. Each of the stops can be centered independently of the others. Each also has an opening, the diameter of which can be varied independently of the others. Thus, the confocal character of the measuring arrangement for each wavelength is separately adjustable and can be adapted to the respective fluorescence intensity of the wavelength concerned.

For visual reflected light investigations, the present invention also allows a conventional illuminating device, for example the light of a halogen lamp, to be coupled in between the beam splitter or mirror and the deflecting device. A means to accomplish this includes using a switchable mirror, for example, a mirror being pivotable into and out of the beam path.

In a particularly advantageous embodiment, the microscope stand is of the inverted type (with the objective arranged beneath the object). Since inverted microscopes are very frequently used in the microbiological field, it is particularly important that the space to the side of the inverted microscope stand be fully available for micromanipulators and microinjection devices. To screen off the laser radiation emerging from the objective through a transparent object, or when the object is removed, a screen that is opaque to laser light should be provided above the object stage. Furthermore, this screen should also be connected via a sensor to the shutter that interrupts the laser beam. This feature ensures that no laser light can enter the eye of the operator when the screen is removed.

Such a screen can also be provided by the presence of a transmission illumination unit above the object plane. The housing wall of this unit simultaneously acts as the screen. For good accessibility of the object space, the transmission illumination unit is pivotably arranged on the stand by means of an arm. Furthermore, sensors are provided on the pivot joint of the arm and are coupled to the shutter for interruption of the laser beam. When the arm is pivoted away from the object, the laser is also interrupted. The sensors on the pivot joint and on the reflected light reflector slide are coupled to the shutter control via a logical AND gate, so that the laser beam is only released with the sensor of the reflector slide and the sensor of the pivot joint simultaneously produce a signal indicating the safe position.

DESCRIPTION OF THE DRAWINGS

The following description more fully explains the invention with reference to the preferred embodiment shown in the accompanying drawings, wherein.

DETAILED DESCRIPTION OF PREFERRED EMBODIMENT

Figure 1:
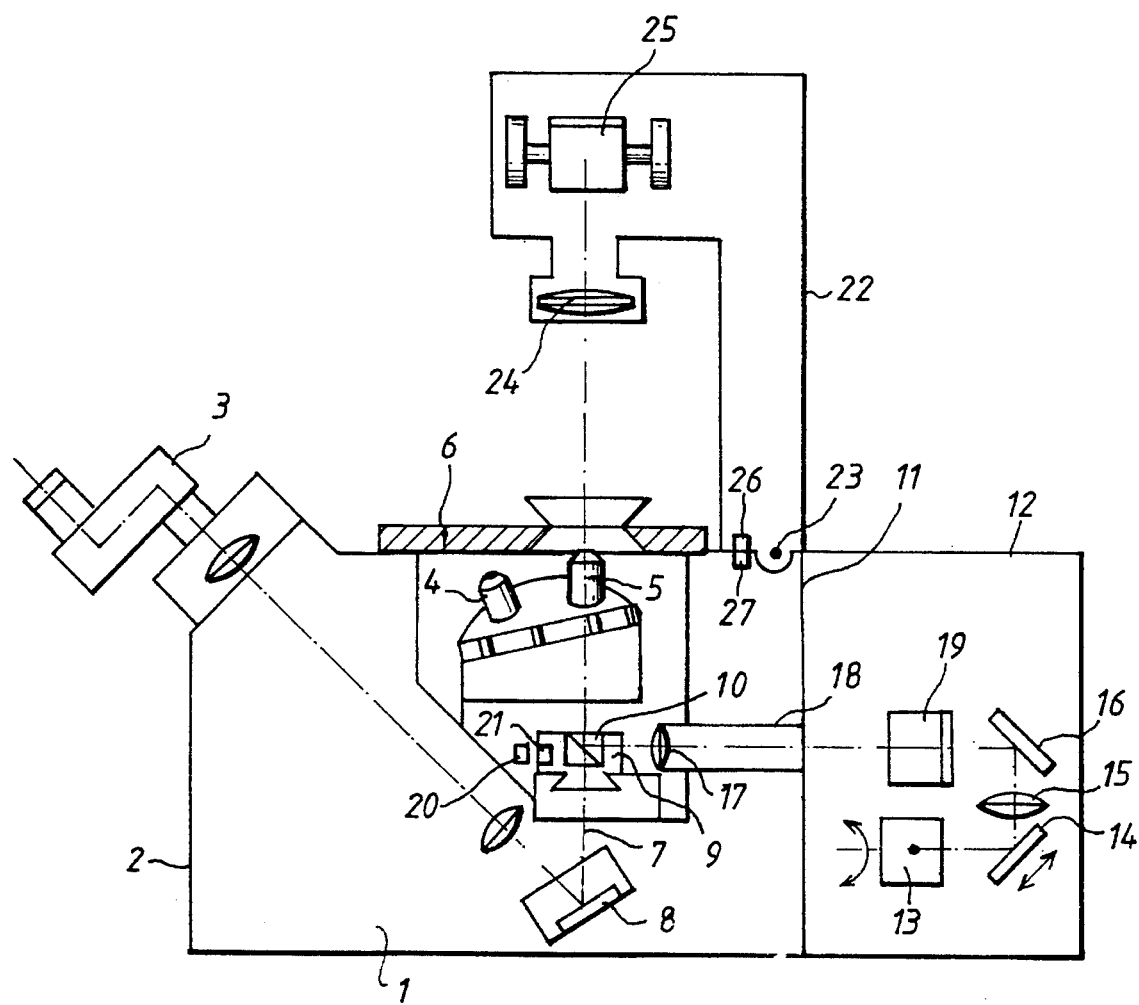
FIG. 1 shows a laser scanning microscope of the inverted type according to the invention, in a cross section containing the optical axis of the objective.

The inverted microscope shown in FIG. 1 has a stand (1), on the front side (2) of which a binocular tube (3) is arranged. Several objectives (5) are received on a revolving nosepiece (4) beneath the object stage (6). The observation beam path that runs along the optical axis (7) of the objective (5) is deflected obliquely upwards towards the ocular tube (3) by a mirror (8) arranged beneath the objective. A reflected light reflector slide (9) is arranged between the objective (5) and the mirror (8). Up to this point, the construction described corresponds to the inverted microscope known from U.S. Pat. No. 5,138,486, which is hereby incorporated by reference with regard to the further components arranged in the observation beam path and the reflection out into a photo tube.

The reflected light reflector slide (9) has at least three switching positions. One of these three switching positions is free and serves for visual transmission microscopy. For visual reflected light microscopy, a 50% beam splitter is provided in the second switching position, and, for confocal microscopy, a fully reflecting mirror (10) is provided in the third switching position. In another embodiment for fluorescence applications, the reflector has four switching positions. For confocal microscopy, one of the switching positions is fitted with the fully reflecting mirror. Two more of the positions are fitted with fluorescence filter sets. The fourth position is unoccupied, for visual transmitted light microscopy, or is equipped with a further fluorescence filter set.

A scanning module (12) is arranged on the rear side (11), facing away from the ocular tube (3) of the microscope stand. The laser scanning module (12) that has its own housing, essentially consists of a scanning unit, e.g. two galvanometer scanners. The scanning unit deflects the laser beam incident perpendicular to the scanning plane in two mutually perpendicular directions. A relay lens system is formed by a tube lens (17) arranged in the microscope stand, together with a lens (15) behind the scanning unit. The relay lens system images the two scanning mirrors (13, 14) in the pupil of the objective (5) on the illumination side.

The coupling of the laser beam into the stand (1) takes place by means of a mirror (16) through the reflected light illumination beam path (18) that is present in most microscope stands. Consequently, the scanning module (12) can easily be adapted to most microscope stands.

An additional switchable mirror (19) is provided between the deflecting mirror (16) and the coupling-in of the laser beam into the microscope stand (1). For visual reflected light microscopy, a conventional microscope lamp (not shown here) can be used by this additional mirror to be coupled into the reflected light illumination beam path, instead of the laser beam.

The position of the fully reflecting mirror (10) on the reflector slide (9) is monitored by a sensor. This sensor, in this case, consists of two magnets (21) that are received in two small bores in the reflector slide (9), and two probes (20) opposite the magnets, received on the guide of the reflector slide (9). If the magnets (21) and the probes (20) are positioned opposite each other, the resulting signal triggers a shutter (not shown here) in the beam path of the laser light and clears the beam path. Since only the switching position of the fully reflecting mirror (10) is monitored by magnets (21), the laser beam path remains interrupted for any other switching position of the reflector slide (9) or when this reflector slide (9) is not present. This sensor prevents eye damage when looking into the ocular tube (3). Including two magnets in the design of the safety device permits the failure of a sensor to be detected, so that the laser beam is interrupted even when a sensor fails to function.

A transmitted light condenser (24) on an arm (22) that can pivot about a horizontal axis (23), and above it a switchable mirror (25), are arranged above the object stage (6). The light can be reflected into a conventional transmission illumination system (not shown here) lying above the drawing plane. Alternatively, for scanning microscopy, the light can be reflected out onto a detector lying below the drawing plane. The housing in which the transmitted light condenser (24) and the switchable mirror (25), and also a detector (29) and a transmitted light illuminating device (28) are arranged serves at the same time to protect against inadvertently looking into the laser light emerging from the objective (5). In order to prevent inadvertently looking into the laser light when the arm (22) is folded away, a sensor (26, 27) is also provided here. The signals of the sensors (20, 21) and (26, 27) are connected together in the sense of a logical AND circuit, so that the laser beam path is only opened when both sensors indicate the safe state.

Figure 2:
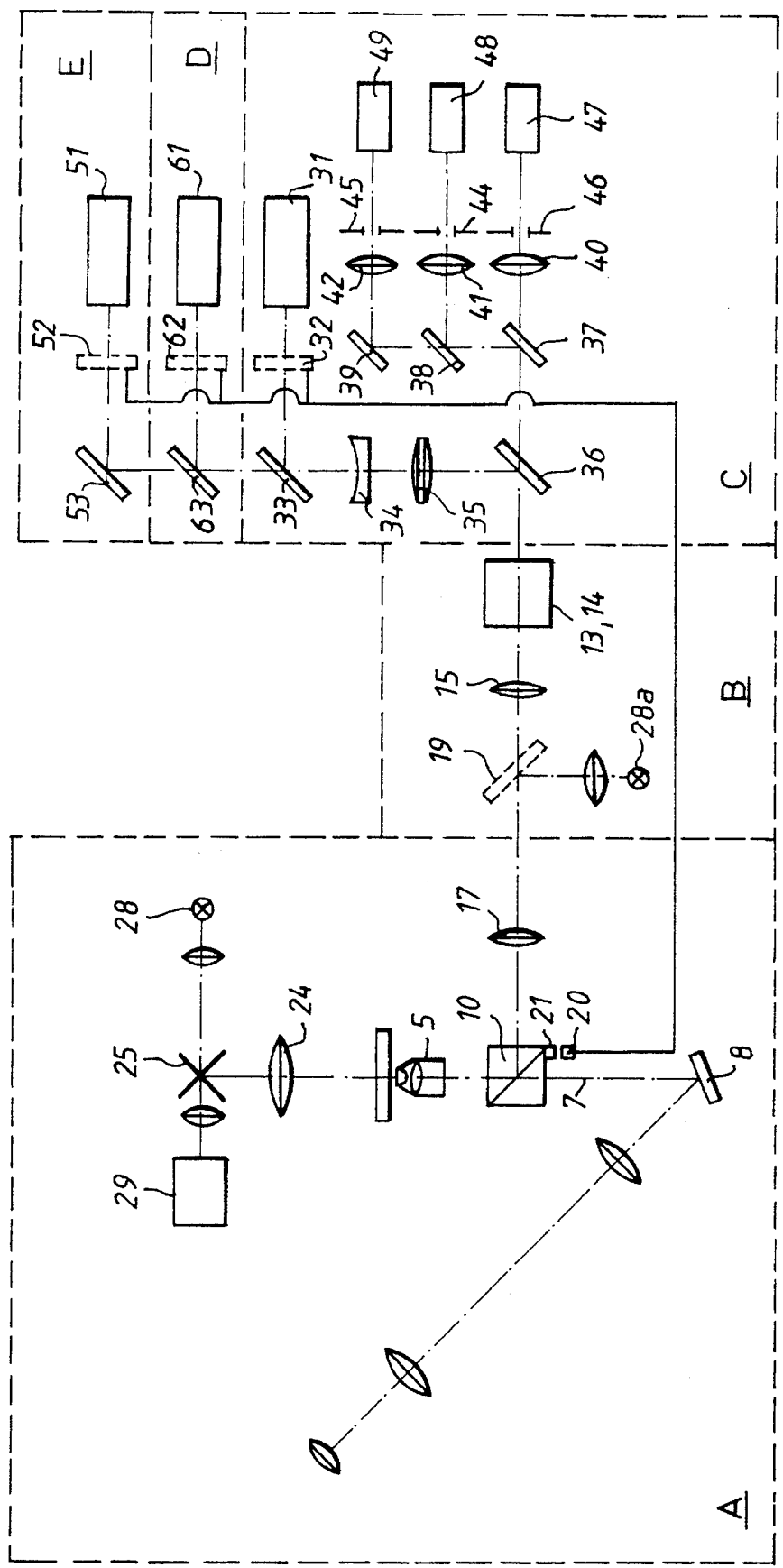
FIG. 2 is a sketch showing in principle the beam path in the microscope according to FIG. 1.

As is clear from FIG. 2, the inverted laser scanning microscope is constructed in a modular manner. It consists of three standard blocks (A, B and C) and also, in principle, arbitrarily many additional laser modules (D and E). In FIG. 2, module (A) represents the microscope stand and module (B) represents the scanning module. The individual optical components are shown in FIG. 2 with the same reference numerals as in FIG. 1. For simplicity, in FIG. 2 all the components are shown in in one plane, although in an actual microscope the components lie in different planes.

Since a description has already been given of the components of the modules (A and B) in connection with FIG. 1, an additional description of these components is omitted.

The detector module (C) is connected to the scanning module (B). This detector module contains a laser (31) with a preceding shutter (32). The shutter (32) is driven by an electromagnet. A color divider (33) deflects the laser beam coming from the laser (31) to a beam expander (34, 35). A further color divider (36) deflects the collimated laser beam emerging from the beam expander (34, 35) to the deflection unit (13, 14). Here, a neutral divider or a polarization divider can also be used for confocal reflected light microscopy.

After passing through the scanning device (13, 14), the collimated laser beam is deflected towards the objective (5) by the fully reflecting mirror (10). The objective (5) focuses the collimated laser beam onto the preparation, which is not shown here.

The fluorescent light or the reflected light excited in the preparation by the laser light passes along the same beam path between the objective and the divider (36), but in the opposite direction of the collimated laser beam. Since the fluorescent light is different in wavelength from the laser light, the color divider (36) transmits the fluorescent light. The fluorescent light is passed to three parallel confocal detection channels by means of two further color dividers (37, 38), with different spectral transmission properties, and a fully reflecting mirror (39). Each of these three confocal detection channels contains an objective (40, 41, 42), a confocal stop (46, 44, 45) and a photodetector (47, 48, 49) to convert the optical radiation into electrical signals. The confocal stops (46, 44, 45) are respectively arranged in a plane that is conjugate to the focal plane of the objective (5). Independently of the others, each of these confocal stops can be centered by means of corresponding adjusting screws (not shown) that are accessible from the outside, and the opening diameters of the confocal stops can be varied. As a result of this adjusting capability, the depth resolution of the microscopic image can be adjusted for each fluorescence wavelength.

The divider (36) that separates the illumination beam path from the measuring beam path, and also the color dividers (37, 38) that separate the measuring light into different detection channels, are respectively received in reflector slides (not shown here). As a result, the most varied combinations of wavelengths can be set and simultaneously registered by means of the different combinations of reflector slides. The color dividers (37, 38) are received within the reflector slides. The reflector slides have an empty switching position. This allows for changing the reflector slide to a completely open passage, which makes it possible to measure very weak fluorescences. Consequently, no additional attenuation of the already weak fluorescent light takes place.

As indicated by the modules (D and E), in principle, many additional external laser modules can be coupled to the detector module (C) for applications with several excitation wavelengths. Each of these additional laser modules (D and E) essentially consists of: a laser (51, 61); its own shutter (52, 62); if necessary, in the case of multiline lasers, a filter for line selection; and adjustable coupling-in optics (53, 63). Each of these adjustable coupling-in optics (53, 63) consists of two adjustable mirrors (only one is shown here).

A particularly advantageous embodiment of the invention is described with reference to the Figures. However, numerous variations are possible. In particular, other sensor types can be used to produce the shutter signals. For example, microswitches or simple electrical contacts can be used. Moreover, several lasers, or more than three parallel detection channels can be provided in the detector module (C).

For the invention, it is important that the fully reflecting mirror (10) transmit no laser light. It is not absolutely essential for the fully reflecting mirror (10) to completely reflect every wavelength. To the contrary, it is entirely sufficient for the fully reflecting mirror (10) to completely reflect light of the laser wavelength. In the case of several lasers of different wavelengths, the reflecting mirror (10) should reflect the light of all the laser wavelengths.

I claim:

1. A microscope comprising:

a microscope stand having a front side and a rear side opposite said front side, an objective attached to said microscope stand and defining an optical axis, an ocular tube for visual observation arranged at said front side of said microscope stand, a reflected light illumination beam path defined by an opening in said microscope stand leading from said rear side of said microscope stand to said optical axis, intersecting said optical axis and comprising at least a tube lens, a radiation source at said rear side of said microscope stand for generating an illuminating radiation beam that is harmful to eyes of an observer, said illuminating radiation beam being coupled into said reflected light illumination beam path at said rear side of said microscope stand, a mirror for deflecting said illuminating radiation beam in a direction toward said objective, said mirror being switchable into and out of said reflected light illumination beam path, a shutter for interrupting and releasing said illuminating radiation beam, said shutter being positioned between said radiation source and said mirror, and a sensor for detecting whether said mirror is switched into or out of said reflected light illumination beam path, said sensor generating a trigger signal coupled to said shutter for triggering said shutter to release said illuminating radiation beam when said mirror is switched into said reflected light illumination beam path and to interrupt said illuminating radiation beam when said mirror is switched out of said reflected light illumination beam path.

2. Microscope according to claim 1, wherein said radiation source comprises a laser.

3. A microscope according to claim 1, further comprising a housing arranged at said rear side of said microscope stand and a radiation beam deflector in said housing between said radiation source and said mirror.

4. A microscope according to claim 3, further comprising a coupling device for coupling a conventional light illuminating device into said reflected light beam path between said mirror and said radiation beam deflector.

5. A microscope according to claim 1, wherein said objective has a focal plane, further comprising a plurality of diaphragms, each of said diaphragms being arranged in a plane confocal to said focal plane of said objective.

6. A microscope according to claim 5, wherein each of said diaphragms has an opening diameter that is arranged to be varied independently of opening diameters of other said diaphragms.

7. A microscope according to claim 1, wherein said microscope stand is an inverted stand.

8. A microscope according to claim 1, further comprising a switchable slide holder having several switching positions that is switchable into said reflected light illuminating beam path, wherein said mirror is mounted on said switchable slide holder.

9. A microscope according to claim 1, further comprising a switchable revolving holder having several switching positions that is switchable into said reflected light illuminating beam path, wherein said mirror is mounted on said switchable revolving holder.

10. A microscope comprising:
   an inverted microscope stand having a front side and a rear side opposite said front side,
   an objective attached to said microscope stand and defining an optical axis,
   an ocular tube for visual observation arranged at said front side of said microscope stand,
   a reflected light illumination beam path defined by an opening in said microscope stand leading from said rear side of said microscope stand to said optical axis, intersecting said optical axis and comprising at least a tube lens,
   a radiation source at said rear side of said microscope stand for generating an illuminating radiation beam that is harmful to eyes of an observer, said illuminating radiation beam being coupled into said reflected light illumination beam path at said rear side of said microscope stand,
   a mirror for deflecting said illuminating radiation beam in a direction toward said objective,
   a shutter for interrupting and releasing said illuminating radiation beam, said shutter being positioned between said radiation source and said mirror,
   an object stage,
   a radiation screen above said object stage, which radiation screen is arranged to be folded away, and
   a sensor generating a trigger signal coupled to said shutter for triggering said shutter to interrupt said illumination radiation beam when said radiation screen is folded away.

11. A microscope according to claim 10, further comprising a pivotable arm having a pivot joint, and a source of transmitted light illumination and a transmitted light detector above said objective stage connected to said microscope stand by means of said pivotable arm, wherein said sensor is positioned on said pivot joint and is coupled to said shutter.

12. A microscope according to claim 10, further comprising an additional sensor for detecting whether said mirror is switched into or out of said reflected light illumination beam path, said additional sensor generating a trigger signal coupled to said shutter for triggering said shutter to release said illuminating radiation beam when said mirror is switched into said reflected light illumination beam path and to interrupt said illuminating radiation beam when said mirror is switched out of said reflected light illumination beam path.

13. A microscope according to claim 12, wherein said sensor and said additional sensor are coupled to said shutter to release said illumination radiation beam only when said sensor and said additional sensor generate trigger signals simultaneously.

14. A microscope according to claim 10, further comprising a switchable slide holder having several switching positions that is switchable into said reflected light illuminating beam path, wherein said mirror is mounted on said switchable slide holder.

15. A microscope according to claim 10, further comprising a switchable revolving holder having several switching positions that is switchable into said reflected light illuminating beam path, wherein said mirror is mounted on said switchable revolving holder.

16. A microscope having a microscope stand, including an optical beam path and an objective arranged along said optical beam path, said objective having a focal plane, said microscope comprising:
   a radiation source for generating an illuminating radiation beam along an illumination beam path,
   a coupling device for coupling said illuminating radiation beam into said optical beam path for illuminating an object,
   a scanning unit for deflecting said illuminating radiation beam into mutually perpendicular directions, said scanning unit being positioned between said radiation source and said coupling device,
   a beam divider positioned between said radiation source and said scanning unit for separating a measuring beam path of radiation leaving an object from said illumination beam path,
   three confocal detection channels each comprising a stop in a plane confocal to said focal plane of said objective and a detector,
   color dividers arranged in said measuring beam path for separating light of said measuring beam path into different ones of said confocal detection channels, and
   reflector slides for receiving said color dividers, said reflector slides having one empty switching position to release said radiation leaving said object completely into one of said three confocal detection channels.

17. A microscope according to claim 16, wherein said objective has a focal plane, further comprising a plurality of planes confocal with said focal plane of said objective and a plurality of stops each arranged in a respective one of said confocal planes.

18. A microscope according to claim 16, wherein said objective has a focal plane, further comprising a plurality of diaphragms, each diaphragm of said plurality of diaphragms being arranged in a plane confocal to said focal plane and having an opening diameter that can be varied independently of an opening diameter of each other diaphragm of said plurality of diaphragms.

19. A microscope according to claim 16, wherein said microscope has a rear side, further comprising a coupling device for coupling said illuminating radiation beam into said illumination beam path from said rear side of said microscope stand.

* * * * *